Jan. 29, 1963  T. J. MPAKARAKES  3,075,765
INDOOR POLE VAULTING BOX
Filed Sept. 26, 1960
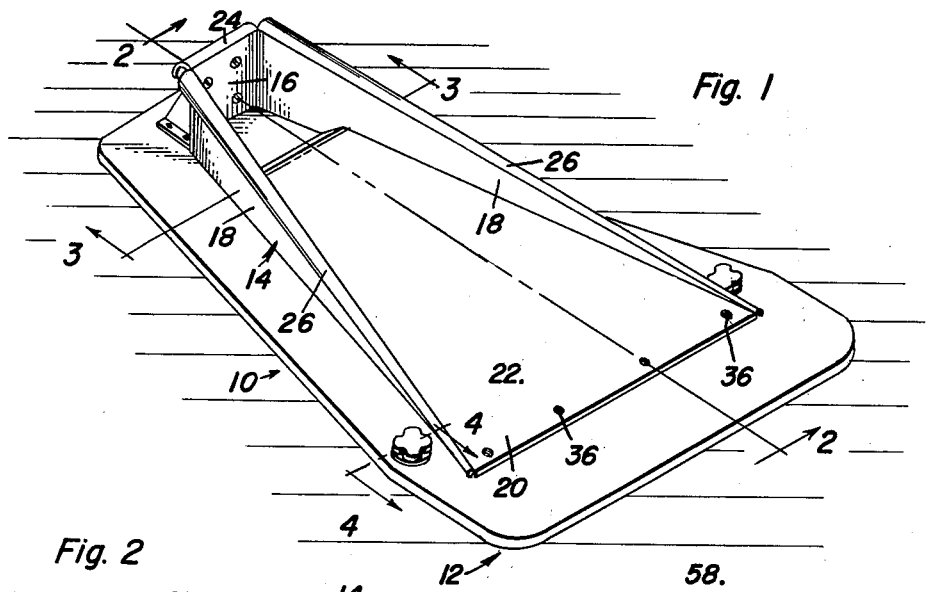
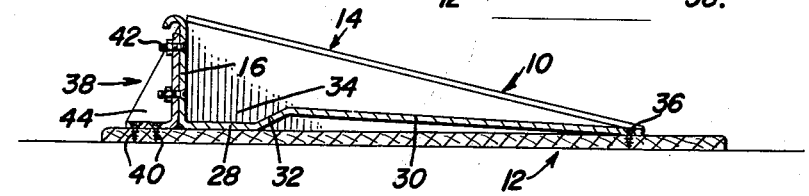
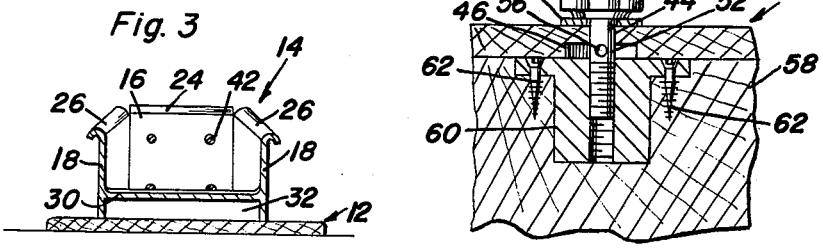
Thomas John Mpakarakes
INVENTOR.
BY *Clarence A. O'Brien*
*and Harvey B. Jacobson*
Attorneys

United States Patent Office 3,075,765
Patented Jan. 29, 1963

3,075,765
INDOOR POLE VAULTING BOX
Thomas John Mpakarakes, 366 Main St., Denville, N.J.
Filed Sept. 26, 1960, Ser. No. 58,471
2 Claims. (Cl. 272—59)

This invention relates to a novel and useful indoor pole vaulting box and more specifically to a pole vaulting box adapted to constitute a stop for the lower end of a pole vaulting pole and also for removable securement to a gym floor.

The present invention includes the provision of a housing member having a gear upstanding stop wall with two opposite side walls projecting forwardly from opposite ends of the rear stop wall. The ends of the opposite side walls remote from the rear stop wall define an open throat area through which the forward or lower end of a pole vaulting pole may readily pass before engaging the rear stop wall. The upper edges of the rear stop wall and the opposite side walls of the pole vaulting box are curled outwardly to provide smooth rounded upper surfaces on the rear and opposite side walls and the opposite side walls are forwardly divergent whereby the forward end of a pole vaulting pole may be guided into seated engagement with the adjacent surfaces of the bottom and rear stop wall of the pole vaulting box. The rear portion of the bottom wall of the pole vaulting box is provided with an upwardly opening recess immediately adjacent the rear stop wall and this recess is defined by means of an upstanding portion of the bottom wall extending transversely across the pole vaulting box a spaced distance forwardly of the rear stop wall. The upstanding portion of the bottom wall enables the pole vaulter to more readily prevent the pole vaulting pole from falling forwardly after the pole vaulter has cleared the bar. The lower end of the pole vaulting pole will normally seat itself against the adjacent surfaces of the rear and bottom walls of the vaulting box and as the pole vaulter reaches his greater height and the pole vaulting pole is disposed substantially vertically, the lower end of the pole vaulting pole is then disposed between the rear stop wall and the upstanding portion of the bottom wall defining the rearmost limit of the recess formed therein. As one side of the lower end of the pole vaulting pole is constrained against forward movement by the rear stop wall of the pole vaulting box and the rear surfaces of the lower end of the vertical pole vaulting pole are in engagement with the upstanding portion of the bottom wall, the pole vaulting pole will normally be prevented from falling forwardly across the bar over which the pole vaulter has passed. However, the upstanding portion of the bottom wall of the pole vaulting box is rearwardly and upwardly inclined and should the pole vaulter for any reason not let go of the pole vaulting pole as he reaches his maximum height, the inclination of the upstanding portion of the bottom wall will enable the pole vaulting pole to fall forwardly with the pole vaulter as he passes between the uprights supporting the bar over which he is attempting to jump. Thus, although the pole vaulting box is specifically adapted to prevent the pole vaulting pole from falling forwardly between the standards, the upstanding portion of the bottom wall does not positively prevent rearward movement of the lower end of the pole vaulting pole and therefore any possible breakage of the pole vaulting pole or damage thereto by the upstanding portion of the bottom wall of the pole vaulting box is eliminated.

The pole vaulting box of the instant invention is provided with means specifically adapted to removably secure the pole vaulting box in position upon a gym floor. The removable securing means includes a plurality of screw shafts rotatably journaled in the base of the pole vaulting box for rotation about vertical axes. The lower ends of the screw shafts project below the lower surface of the base of the vaulting box and are adapted for threaded engagement within sockets recessed within a gym floor such as the conventional type of socket used for securing volleyball standards in upright positions.

The main object of this invention is to provide an indoor pole vaulting box which may be readily and removably secured to a gym floor in a manner utilizing conventional types of volleyball standard sockets recessed within the gym floor whereby it will be unnecessary to provide other means for securing the pole vaulting box in position upon a gym floor.

A further object of this invention, in accordance with the immediately preceding object, is to provide an indoor pole vaulting box which will assist the pole vaulter in preventing the pole vaulting pole from falling forwardly after the pole vaulter has reached his maximum height.

And a final object to be specifically enumerated herein is to provide an indoor pole vaulting box which will conform to conventional forms of manufacture, be of simple construction and easy to install so as to provide a device that will be economically feasible, long lasting and relatively trouble-free during installation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the indoor pole vaulting box of the instant invention shown removably secured to a portion of flooring;

FIGURE 2 is a vertical longitudinal sectional view taken substantially upon the plane indicated by the section line 2—2 on somewhat of a reduced scale;

FIGURE 3 is a transverse vertical sectional view taken substantially upon the plane indicated by the section line 3—3 of FIGURE 1;

FIGURE 4 is an enlarged transverse fragmentary vertical sectional view taken substantially upon the plane indicated by the section line 4—4 of FIGURE 1 and showing the manner in which the pole vaulting box is removably secured to a section of flooring utilizing countersunk internally threaded sockets secured therein.

Referring now more specifically to the drawings, the numeral 10 generally designates the pole vaulting box of the instant invention. The pole vaulting box 10 includes a base generally referred to by the reference numeral 12 and a housing generally referred to by the reference numeral 14. The base 12 is substantially the same shape in plane as the housing 14 but is somewhat larger in dimensions so as to extend beyond the opposite sides and ends of the housing 14.

The housing 14 includes an upstanding rear stop wall 16 and a pair of opposite side walls 18. A bottom wall 20 is disposed between the inner surfaces of the end and opposite side walls 16 and 18 and the end and side walls 16 and 18 are formed integrally therewith. The opposite side walls 18 are forwardly divergent and define an open throat area 22 between their forward ends. The upper edges or marginal portions of the rear and opposite side walls 16 and 18 are outwardly curled as at 24 and 26, respectively, and the upper edges of the side walls 18 are forwardly and downwardly inclined.

The bottom wall includes a rear horizontal portion 28, and a forwardly and downwardly inclined portion 30 and an intermediate upstanding portion 32 extending transversely of the housing 14 between the opposite side walls 18. The upstanding portion 32 of the bottom 20 defines the rearmost limit of an upwardly opening recess 34 and the forward portion of the bottom wall 20 is forwardly and downwardly inclined and secured at its forward edge to the base 12 by means of suitable fasteners 36.

The housing 14 includes a rear bracing member generally referred to by the reference numeral 38 which is secured between the upper surface of the base 12 disposed rearwardly of the rear wall 16 and the rear face of the rear wall 16 by means of suitable fasteners 40 and 42, respectively. The bracing member 38 includes a pair of longitudinally extending fillets 44 which extend between the confronting surfaces of the legs of the L-shaped bracing member 38.

A pair of opposite side vertical bores 44 are formed through the forward end of the base 12 which are each provided with lower end counterbores 46. A thumb screw generally designated by the reference numeral 48 and including a diametrically enlarged upper end head portion 50 and a screw shaft 52 is rotatably journaled in the bore 44. An anti-friction washer 54 is disposed between the head 50 and the upper surface of the base 12 and a retaining pin 56 is secured diametrically through a screw shaft 52 and has its opposite ends received within the counterbore 46 to retain the thumb screw 48 in position with its lowermost end projecting below the base 12.

The flooring 58 has a pair of internally threaded sockets 60 recessed and secured therein by means of fasteners 62 and the lowermost ends of the thumb screws 48 may be threadedly engaged in the recessed sockets 60 in order to removably secure the pole vaulting box 10 to the flooring 58. It is to be noted that the distance between the thumb screws 48 is to be equal to the distance between adjacent conventional types of internally threaded and recessed sockets secured in gym floors for the purpose of supporting volleyball standards. In this manner, the indoor pole vaulting box 10 may be readily secured to the flooring 58 by means of the internally threaded and recessed sockets 60 which are already secured therein thereby eliminating the need for special means for securing the indoor pole vaulting box 10 to the flooring 58. In operation, as the pole vaulter approaches the indoor pole vaulting box 10, the forward end of the pole vaulting pole passes through the throat area and abuts the adjacent surfaces of the rear wall 16 and the rear portion 28 of the bottom wall 20. As the pole vaulter reaches his maximum height and the pole vaulting pole is substantially vertically disposed, the rear surfaces of the lower end of the pole will engage the surfaces of the upstanding portion 32 of the bottom wall immediately adjacent the rear portion 28 thereof to assist in preventing the pole vaulting pole from falling forwardly between the pole vaulting uprights. The upper marginal portions of the rear and side walls 16 and 18 are curled outwardly to provide smooth upper edges whereby injury to a pole vaulter falling upon the indoor pole vaulting box 10 will be greatly minimized.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An indoor pole vaulting box comprising a stop housing, said stop housing including a mounting base adapted to overlie a horizontal supporting surface, an upstanding rear stop wall carried by said housing, a pair of upstanding side walls extending forwardly from opposite end portions of said rear stop wall and defining an open throat area between the forward ends thereof in the forward end of said housing, said side walls being forwardly divergent and the upper edges thereof being forwardly and downwardly inclined, the upper edges of said side walls being curled outwardly to provide a rounded upper surface, a bottom wall interconnecting said rear stop wall and the lower edges of said side walls, said bottom wall including a depressed and upwardly opening recess adjacent said rear wall whose forward limit is defined by a forwardly and upwardly inclined portion of said bottom wall extending transversely thereof, said bottom wall, forwardly of said recess, being rearwardly and upwardly inclined so as to present a target of greater height for a pole vaulter to hit with the forward or lowered end of a pole, said forwardly and upwardly inclined portion of said bottom wall enabling the lower end of a pole received in said recess to move forwardly of said housing and out of said recess when the upper end of the pole is forced toward said rear stop wall and past its vertical position so as to preclude breaking the pole and thereby providing a safety factor for the pole vaulter while simultaneously providing sufficient resistance to prevent the pole from falling rearwardly toward said rear wall when the vaulter releases the pole at the proper instant.

2. The combination of claim 1 wherein said base includes a portion disposed rearwardly of said rear stop wall, a bracing member secured between the upper surface of said base and the rear surface of said rear stop wall, said bracing member including at least one longitudinally extending fillet.

References Cited in the file of this patent
UNITED STATES PATENTS

| | | |
|---|---|---|
| 1,168,666 | Medart | Jan. 18, 1916 |
| 2,110,254 | Austin | Mar. 8, 1938 |
| 2,473,680 | Farris | June 21, 1949 |

FOREIGN PATENTS

| | | |
|---|---|---|
| 794,880 | Great Britain | May 14, 1958 |